United States Patent [19]

Wong

[11] Patent Number: 4,699,403
[45] Date of Patent: Oct. 13, 1987

[54] SELF-CONTAINED CONNECTORS FOR STANDARD TUBES

[75] Inventor: Tak-Yiu Wong, Duarte, Calif.

[73] Assignee: Imo Delaval Inc., Lawrenceville, N.J.

[21] Appl. No.: 788,326

[22] Filed: Oct. 17, 1985

[51] Int. Cl.[4] .......................................... F16L 21/08
[52] U.S. Cl. .................................. 285/233; 285/315; 285/321
[58] Field of Search ............... 285/233, 315, 321, 308, 285/316, 277, DIG. 906

[56] References Cited

U.S. PATENT DOCUMENTS

| | | |
|---|---|---|
| 1,587,079 | 6/1926 | Machino . |
| 2,092,116 | 9/1937 | Hansen ............................ 285/316 X |
| 2,318,965 | 5/1943 | Parker et al. .................... 285/277 X |
| 2,344,740 | 3/1944 | Shaff ................................. 285/277 |
| 2,521,701 | 9/1950 | Earle et al. . |
| 2,579,314 | 12/1951 | Grumblatt . |
| 2,631,872 | 3/1953 | Wurmser . |
| 2,805,089 | 9/1957 | Hansen ............................ 285/321 X |
| 2,914,344 | 11/1959 | Anthes . |
| 2,939,728 | 6/1960 | Bitel . |
| 3,120,968 | 2/1964 | Calvin . |
| 3,352,576 | 11/1967 | Thorne-Thomsen . |
| 3,428,340 | 2/1969 | Pelson ............................. 285/321 X |
| 3,439,943 | 4/1922 | Thorne-Thomsen . |
| 3,468,562 | 9/1969 | Ho Chow et al. . |
| 3,569,903 | 3/1971 | Brishka ........................... 285/315 X |
| 3,635,501 | 1/1972 | Thorne-Thomsen . |
| 3,712,646 | 11/1973 | Bergougnoux ..................... 285/315 |
| 3,776,579 | 12/1973 | Gale ................................. 285/233 |
| 3,922,011 | 11/1975 | Walters ............................ 285/315 X |
| 3,999,825 | 12/1976 | Cannon . |
| 4,063,760 | 12/1977 | Moreiras . |
| 4,219,222 | 8/1980 | Brusadin ......................... 285/315 X |
| 4,362,326 | 12/1982 | F'Geppert . |
| 4,496,172 | 1/1985 | Walker . |

FOREIGN PATENT DOCUMENTS 671480 5/1952 United Kingdom .
576481 10/1977 U.S.S.R. .

Primary Examiner—Dave W. Arola
Attorney, Agent, or Firm—Benoit Law Corporation

[57] ABSTRACT

Fully integrated self-contained connectors for standard tubes include a first annular member having an axial bore preferably of a continuously hollow-cylindrical configuration for receiving ferrules of those standard tubes. A locking arrangement peripheral of the first annular member carries locking members extending through openings in that first annular member for retaining a ferrule at a tube retention shoulder in a locking position. At least one further annular member is axially slidable on the first annular member and houses the locking arrangement outside that first annular member. The locking members are actuated to a locking position upon axial sliding of the further annular member in one direction. Conversely, the locking members are actuated to a release position upon axial sliding movement of the further annular member in another direction. The further annular member may define one or more internal ramps for that purpose. If two further annular members are employed, then they preferably are axially slidable on the first annular member in a push-pull manner relative to each other.

38 Claims, 7 Drawing Figures

SELF-CONTAINED CONNECTORS FOR STANDARD TUBES

BACKGROUND OF THE INVENTION

1. Field of the Invention

The subject invention relates to connectors and connector unions for standard tubes and pipes and, more specifically, to fully integrated self-contained connectors and unions with various built-in safety features.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Except for the familiar threaded or glued tube and pipe connectors, most types of fluid conduit, pipe or hose connectors appear to require the presence of interfitting male and female members, as may be seen from U.S. Pat. Nos. 4,063,760, by L. Moreiras, issued Dec. 20, 1977, 3,922,011, by T. Walters, issued Nov. 25, 1975, 3,635,501, by T. Thorne-Thomsen, issued Jan. 18, 1972, 3,439,943, by T. Thorne-Thomsen, issed Apr. 22, 1969, 3,352,576, by T. Thorne-Thomsen, issued Nov. 14, 1967, 3,468,562, by Ho Chow et al, issued Sept. 23, 1969, 3,428,340, by H. L. Pelton, issued Feb. 18, 1969, 3,120,968, by J. H. Calvin, issued Feb. 11, 1964, 2,939,728, by J. A. Bitel, issued June 7, 1960, 2,914,344, by C. C. Anthes, issued Nov. 24, 1959, 2,631,872, by F. T. wurmser, issued Mar. 17, 1953, 2,579,314, by V. J. Grumblatt, issued Dec. 18, 1951, 2,521,701, by C. E. Earle et al, issued Sept. 12, 1950, and 1,587,079, by S. Machino, issued June 1, 1926, British Pat. No. 671,480, by R. Creelman, published May 7, 1952, and Soviet Pat No. 576,481, by V. V. Abramov et al, issued Oct. 15, 1977, for instance.

In practice, this requires rather special tooling, machining or expensive manufacturing steps in providing the interfitting male and female coupling members. For instance, there is no practically feasible way of making the wire loop cage of the female member of the above mentioned Walters U.S. Pat. No. 3,922,011 by machining.

Moreover, interfitting male and female members rather typically make for a stiff coupling joint, so that there is no significant flexibility which would tolerate lateral angular movements of the interconnected pipes.

Furthermore, the above mentioned references include couplings in which a threaded nut has to be removed in order to effect disconnection of an inserted male member, as may be seen from the above mentioned U.S. Pat. Nos. 4,063,760, by L. Moreiras, and 2,579,314, by V. J. Grumblatt, and British Pat. No. 671,480, by R. Creelman, for instance. In fact, the above mentioned U.S. Pat. No. 4,063,760, by L. Moreiras, proposes a second embodiment that does not require removal of a threaded nut. However, the coupling according to that further embodiment has to be destroyed if disconnection thereof is desired.

Many of those proposed couplings also require forceful insertion of the male member against the bias of a locking spring, and frequently need to accommodate the locking spring in an annular groove in which the locking spring comes to sit loosely, after the male member has been fully inserted, as may, for instance, be seen from the above mentioned U.S. Pat. Nos. 4,063,760, by L. Moreiras, 3,120,968, by J. H. Calvin, and 2,939,728, by J. A. Bitel, British Pat. No. 671,480, by R. Creelman, and Soviet Pat. No. 576,481, by V. V. Abramoy et al.

If garter springs are employed for that purpose, then a design results in which the locking spring is easily pulled out of the fixture, such as in the case of the above mentioned U.S. Pat. No. 2,914,344, by C. C. Anthes. The latter and other proposals mentioned above do not even provide a self-locking action, so that it is readily possible that the connection will blow open under pressure.

Moreover, many of these proposals require the provision and housing of a helical or other lateral spring, which makes for a longer coupling design, as may be seen from the above mentioned U.S. Pat. Nos. 3,439,943, by T. Thorne-Thomsen, 3,352,576, by T. Thorne-Thomsen, 3,468,562, by Ho Chow et al, 3,120,968, by J. H. Calvin, 2,631,872, by E. T. Wurmser, 2,521,701, by C. E. Earle et al, and 1,587,079, by S. Machino.

The number of engagement points is inherently limited in these and other references, such as the above mentioned U.S. Pat. Nos. 3,428,340, by H. L. Pelton, 3,352,576, by T. Thorne-Thomsen, 2,521,701, by C. E. Earle et al, and 1,587,079, by S. Machino, and the Soviet Pat. No. 576,481, which renders the achievable tightness of the fluid coupling unde high pressure questionable.

References which provide a kind of valving in the joint members introduce a severe restriction of the fluid flow passage and sharply reduce throughput, as may, for instance, be seen from the above mentioned U.S. Pat. No. 3,120,968, by J. H. Calvin, and from U.S. Pat. No. 4,362,326, by E. F'Geppert, issued Dec. 7, 1982. The latter proposal also requires loose locking wires and an annular locking mechanism to encompass the outside of the interlocking tubes themselves.

Against this background, the tubing coupling with electrical bonding according to U.S. Pat. No. 3,999,825, by Clifford D. Cannon, issued Dec. 28, 1976, to a subsidiary of the subject assignee, has the great advantage of permitting a flexible interconnection of standard tubing. Only lack of skill of the operator could effectively impair that coupling which, in practice, could, however, be a serious factor with careless personnel that fail to apply themselves to the task at hand.

As its name implies, the subsea wellhead connectors according to U.S. Pat. No. 4,496,172, by J. M. Walker, are more suitable for hydraulic connect and disconnect at a submarine or other remote location.

SUMMARY OF THE INVENTION

It is a general object of this invention to overcome the disadvantages and to meet the needs expressed or implicit in the above Information Disclosure Statement or in other parts hereof.

It is a germane object of this invention to provide improved devices, apparatus and systems of the kind mentioned or implicit in the above Field of the Invention.

It is a related object of this invention to provide improved connectors or couplings for tubes or pipes.

It is also an object of this invention to provide connectors with increased ease of handling and actuation and with increased reliability and safety of connection as well.

It is a related object of this invention to provide improved connectors for use on standard tubes or standardized tube endings.

It is a further object of this invention to provide fully integrated self-contained connectors or connector unions.

It is a germane object of this invention to provide fully integrated self-contained connectors or connector unions characterized by quick connect/disconnect operability, flexibility of angular and longitudinal movement of interconnected tubes, safe retention of interconnected tubes under vibrational conditions, electrical bonding of interconnected tubes, feel or other indication of achievement of full connection, and automatic locking of connection, as desired or needed.

Other objects of the invention will become apparent in the further course of this disclosure.

From a first aspect thereof, the invention resides in a fully integrated self-contained connector for use on standard tubes having a ferrule defining a tube retention shoulder, comprising, in combination, a first annular member having an axial bore for receiving the ferrule, locking means including a spring wire peripheral of the first annular member and carrying locking members extending through openings in the first annular member for retaining in a locking position the ferrule at said tube retention shoulder, and a second annular member axially slidable on the first annular member and housing the spring wire outside the first annular member, with the second annular member having an internal ramp tapering relative to an axis through the first and second annular members and extending under sections of the spring wire between the locking members for lifting the locking members via the spring wire radially away from the tube retention shoulder for a release of the ferrule from the connector upon axial sliding movement of the second annular member on the first annular member in the direction of said tapering.

From a related aspect thereof, the invention resides in a fully integrated self-contained connector union for interconnecting two standard tubes having, respectively, a first ferrule and a second ferrule defining a first tube retention shoulder and a second tube retention shoulder. The invention according to this aspect resides, more specifically, in a combination comprising a first annular member having an axial bore for receiving the first and second ferrules from different ends thereof, first locking means including a first spring wire peripheral of the first annular member and carrying first locking members extending through openings in the first annular member for retaining in a locking position the first ferrule at the first tube retention shoulder, a second annular member axially slidable on the first annular member and housing the first spring wire outside the first annular member, with the second annular member having a first internal ramp tapering relative to an axis through the first and second annular members and extending under sections of the first spring wire between the first locking members for lifting the first locking members via the first spring wire radially away from the first tube retention shoulder for a release of the first ferrule from the connector union upon axial sliding movement of the second annular member on the first annular member in the direction of the tapering of the first ramp, second locking means including a second spring wire peripheral of the first annular member and carrying at an axial distance from the first locking members second locking members extending through further openings in the first annular member for retaining in a locking position the second ferrule at the second tube retention shoulder, and a third annular member axially slidable on the first annular member and housing the second spring wire outside the first annular member, with the third annular member having a second internal ramp tapering relative to an axis through the first and third annular members and extending under sections of the second spring wire between the second locking members for lifting the second members via the second locking spring wire radially away from the second tube retention shoulder for a release of the second ferrule from the connector union upon axial sliding movement of the third annular member on the first annular member in the direction of the tapering of the second ramp. That second internal ramp tapers in a direction opposite the tapering of the first internal ramp, whereby the second ferrule is released upon axial sliding movement of the third annular member in a direction opposite to the axial sliding movement of the second annular member.

From another related aspect thereof, the invention resides in a fully integrated self-contained connector union for interconnecting two standard tubes having, respectively, a first ferrule and a second ferrule defining a first tube retention shoulder and a second tube retention shoulder. The invention according to this aspect resides, more specifically in a combination comprising a first annular member having an axial bore for receiving the first and second ferrules from different ends thereof, first locking members for retaining in a locking position the first ferrule at the first tube retention shoulder in the first annular member and for alternatively releasing the first ferrule from the connector union in a release position of the first locking members, second locking members located at an axial distance from the first locking members for retaining in a locking position the second ferrule at the second tube retention shoulder in the first annular member and for alternatively releasing the second ferrule from the connector union in a release position of the second locking members, second and third annular members axially slidable on the first annular member in a push-pull manner relative to each other, including a first direction toward each other and a second direction away from each other, and means for linking the first and second locking members to the second and third annular members, respectively, including means for actuating and retaining the first and second locking members to the locking position upon axial sliding of the second and third annular members in one of the first and second directions, and for actuating the first and second locking members to the release position upon axial sliding of the second and third annular members in the other of the first and second directions.

The actuating means mentioned in the preceding paragraph include in the second and third annular members, respectively, first and second internal ramps tapering in opposite directions relative to an axis through the first, second and third annular members, and the above-mentioned linking means are biased against the first and second internal ramps radially inwardly toward a longitudinal axis of said axial bore, but are lifted against such bias by the first and second tapering ramps upon axial sliding movement of the second and third annular members.

From another aspect thereof, the invention resides in a fully integrated self-contained connector for use on standard tubes having a ferrule defining a tube retention shoulder, comprising, in combination, a first annular member having an axial bore for receiving the ferrule, locking means peripheral of the first annular member and carrying locking members extending through openings in the first annular member for retaining in a locking position the ferrule at the tube retention shoulder, and a second member threaded on the first annular member and containing the locking means outside the first annular member, with the second annular member having internal ramp means tapering relative to an axis through the first ans second annular members for depressing the locking means inwardly upon rotation in a first sense of the second annular member threaded on the first annular member until the locking members are in the locking position, and for releasing the locking members radially away from the tube retention shoulder for a release of the ferrule from the connector upon rotation of the second annular member in a second sense.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
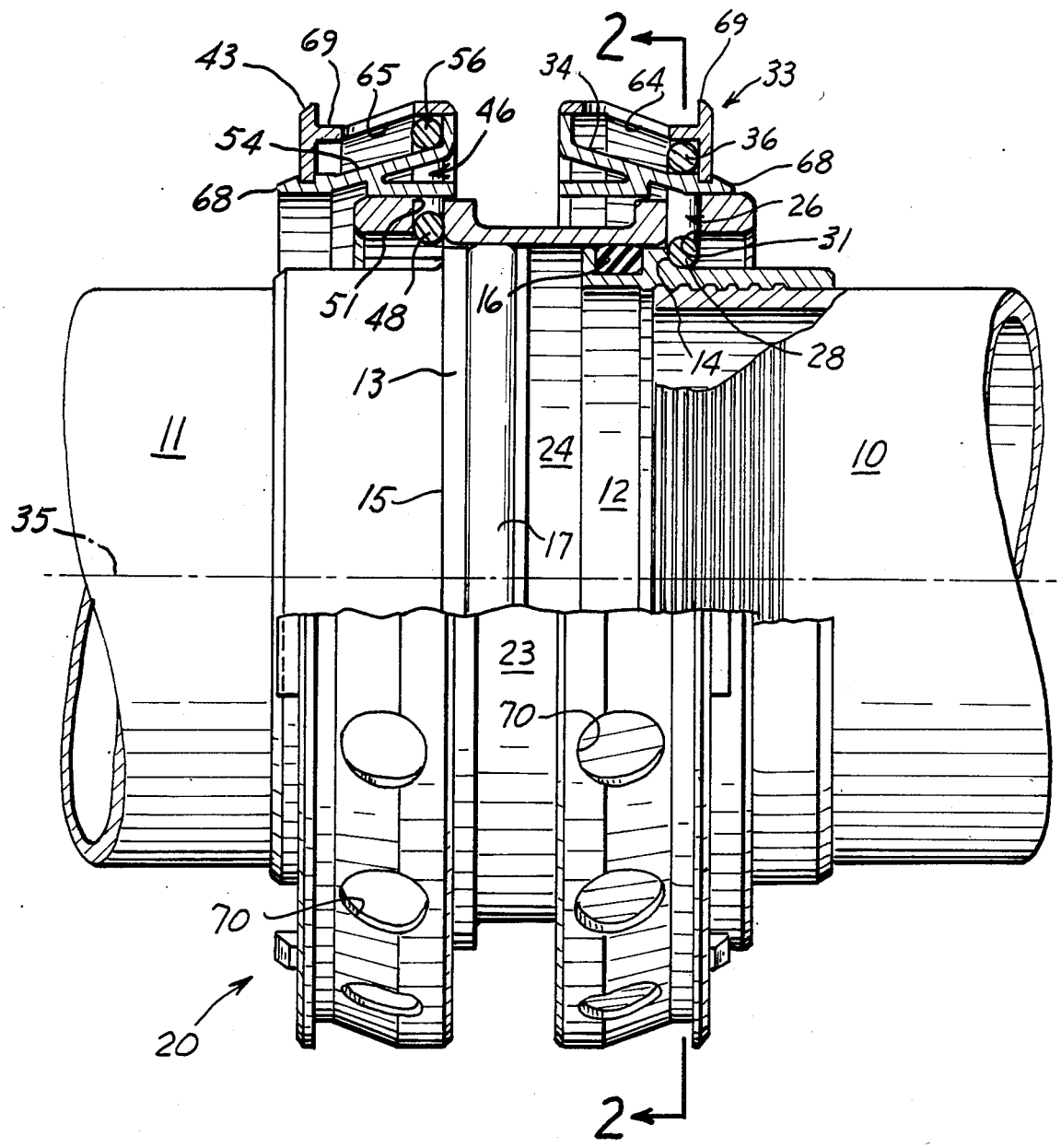
FIG. 1 is a side view, partially in section, of an integrated self-contained connector union according to a preferred embodiment of the subject invention, and a side view of interconnected standard tube ends.

The couplings, connectors and union according to the illustrated preferred embodiments of the invention are suitable for use on standard tubes 10 and 11 having a ferrule 12 or 13 defining a tube retention shoulder 14 or 15. As shown in the drawings, each ferrule may carry a laterally projecting sealing O-ring 16 or 17.

Of course, the subject invention is not limited to use on standard tubes of the type shown in the drawings, but it is a special feature of preferred embodiments of the subject invention that none of the special interfitting male and female members, that characterized the bulk of the prior art, are required in the practice of the subject invention.

The fully integrated self-contained connectors or connector unions 20, 21 and 22 according to the illustrated preferred embodiments of the subject invention include a first annular member 23 having an axial bore 24 for receiving the ferrules 12 and 13.

According to the best mode currently comtemplated, the axial bore 24 in the first annular member 23 has a continuously hollow-cylindrical configuration for receiving the ferrules 12 and 13. Of course, the first annular member 23 can be stepped in diameter at the outside and even at the inside thereof, however, the axial bore 24 itself which receives the ferrules 12 and 13 is not stepped so as to stop the ferrules at the inside thereof, but in fact has the preferred continuously hollow-cylindrical configuration shown in the drawings. In practice, this has the advantage of providing great flexibility for axial and lateral movement of interconnected tubes 10 and 11.

In each such longitudinally or angularly moved position, the O-ring 16 or 17 provides a fluid-type sealing connection between the first annular member 23 and the ferrule 12 or 13.

Figure 3:
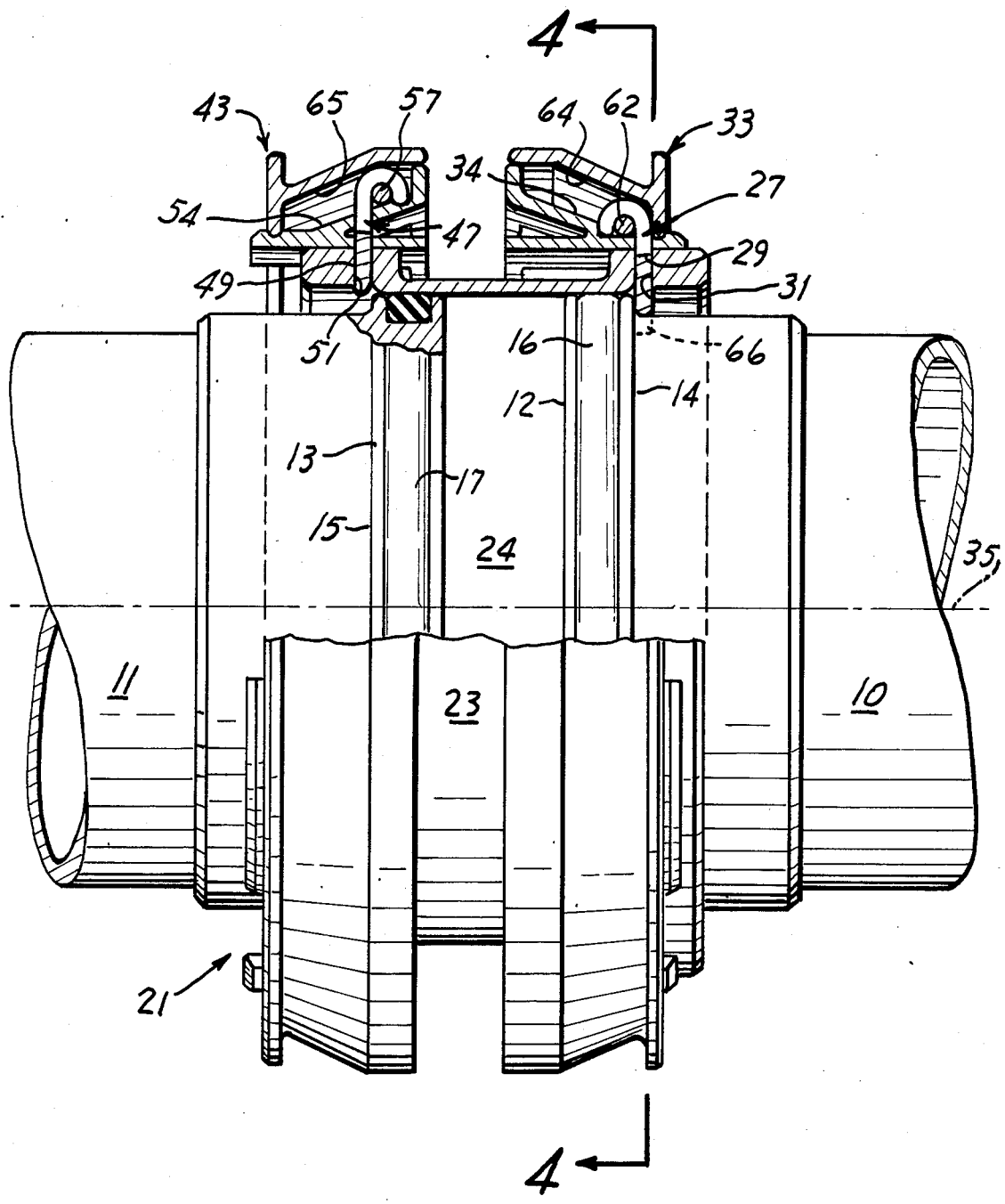
FIG. 3 is a view similar to FIG. 1, showing a modification according to a further preferred embodiment of the subject invention.
Figure 5:
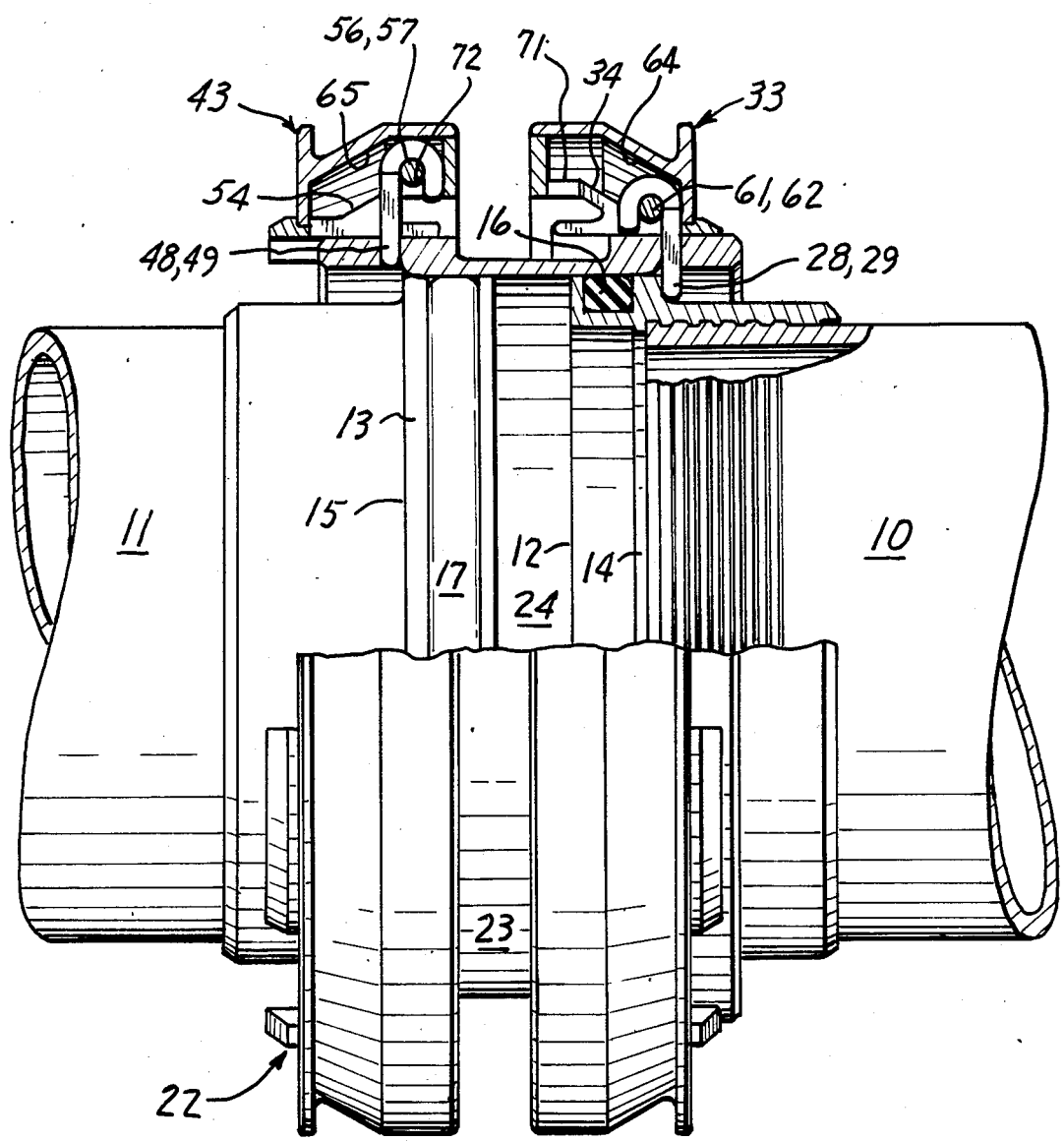
FIG. 5 is a view similar to FIGS. 1 and 3, showing a modification according to a further embodiment of the subject invention in a somewhat diagrammatic manner.

Locking means 26 or 27 peripheral of the first annular member 23 carry locking members 28 or 29 extending through openings 31 in the first annular member 23 for retaining in a locking position a ferrule at the tube retention shoulder 14, as shown for the ferrule 12 in FIGS. 1, 3 and 5. A second annular member 33 is axially slidable on the first annular member 23 and houses the locking means 26 or 27 outside of the first annular member.

The second annular member 33 has an internal ramp 34 tapering relative to an axis 35 through the first and second annular members 23 and 33, and extending under sections 36 or 37 of the locking means 26 or 27 above the locking members 28 or 29 for lifting such locking members via the locking means radially away from the tube retention shoulder 14 for a release of the ferrule 12 from the connector 20, 21 or 22 upon axial sliding movement of the second annular member on the first annular member 23 in the direction of the tapering 34.

In the drawings, this has been shown for the annular member 43.

However, it should be noted in this respect that the connectors according to the subject invention are also suitable as single connectors for attaching only one tube 10 or 11 at the time to a bulkhead or other structure. In that case, the third annular member 43 would be omitted and the first annular member 23 connected directly to such bulkhead or other structure.

Nevertheless, the prospectively most useful embodiments of the subject invention are seen in connector unions in which there is a third annular member 43 with second locking means 46 or 47, peripheral of the first annular member and carrying at an axial distance from the first locking members 26 or 27, second locking members 48 or 49 extending through further openings 51 in the first annular member 23 for retaining in a locking position the second ferrule 13 at the second tube retention shoulder 15, as shown for the ferrule 12 and first locking members 28 or 29 at the tube retention shoulder 14.

The third annular member 43 is axially slidable on the first annular member 23 and houses the second locking means 46 or 47 outside the first annular member.

In similarity to the second annular member 33, the third annular member 43 has a second internal ramp 54 tapering relative to the axis 35 through the first and third annular members and extending under sections 56 or 57 of the second locking means 46 or 47, which corresond to the sections 36 and 37 of the locking means 26 and 27, respectively, above the second locking members 48 or 49, which correspond to the locking members 28 and 29, respectively, for lifting, in this case, the second locking members 48 and 49 via the second locking means 46 or 47 radially away from the second tube retention shoulder 15 for a release of the second ferrule 13 from the connector union 20, 21 or 22 upon axial sliding movement of the third annular member 43 on the first annular member 23 in the direction of the tapering of the second ramp 54.

The expression "axial sliding movement" as herein employed is not intended to mean that the second and third annular members necessarily slide directly on the first member. Rather, that expression is intended to distinguish from rotational movements.

According to the illustrated preferred embodiments of the subject invention, the second internal ramp 54 is tapering in a direction opposite the tapering of the first internal ramp 34, whereby the second ferrule 13 is released upon axial sliding movement of the third annular member 43 in a direction opposite to the axial sliding movement of the second annular member 33 for release of the first ferrule 12. As seen in FIGS. 1 and 3, the second internal ramp 54 structurally represents a mirror image of the first internal ramp 34.

In general, the second and third annular members 33 and 43 are axially slidable on the first annular member 23 in a push-pull manner relative to each other, including a first direction toward each other and a second direction away from each other.

Within the broad scope of the subject invention, means other than those shown in the drawings may be employed for linking the first and second locking members 28 or 29 and 48 or 49 to the second and third annular members 33 and 43, respectively, and means other than those shown may be employed for actuating the latter first and second locking members to the locking position upon axial sliding movement of the second and third annular members 33 and 43 in one of the first and second directions, such as in a direction toward each other, and for actuating the first and second locking members to the release position upon axial sliding of the second and third annular members 33 and 43 in the other of the mentioned first and second directions, such as in a direction away from each other, as seen in the drawings.

However, in the illustrated preferred embodiment, the latter actuating means include, in the first and second annular members 33 and 43, respectively, first and second internal ramps 34 and 54 tapering in opposite directions, as disclosed above.

The first annular member again has an axial bore 24 for receiving the first and second ferrules 12 and 13 from different ends thereof. For axial and lateral angular flexibility, such axial bore in the first annular member preferably has again a continuously hollow-cylindrical configuration for receiving the first and second ferrules without any stop or other internal discontinuity between such ferrules 12 and 13.

The locking means 26, 27, 46 and 47 preferably are biased against the internal ramp 34 and 54, respectively, radially inwardly toward the axis 35, but are lifted against such bias by the tapering ramp 34 or 54 upon axial sliding movement of the second or third annular member 33 or 43.

According to the illustrated preferred embodiments of the invention, the locking means 26, 27, 46 and 47 include a locking spring wire 61 or 62, or other locking spring means carrying the locking members 28, 29, 48 or 49. The internal ramps 34 and 54 then extend under sections of the locking wires 61 and 62 or under the other locking spring means, respectively, for lifting the locking members radially away from the tube retention shoulder 14 or 15 for a release of the ferrule 12 or 13.

Figure 2:
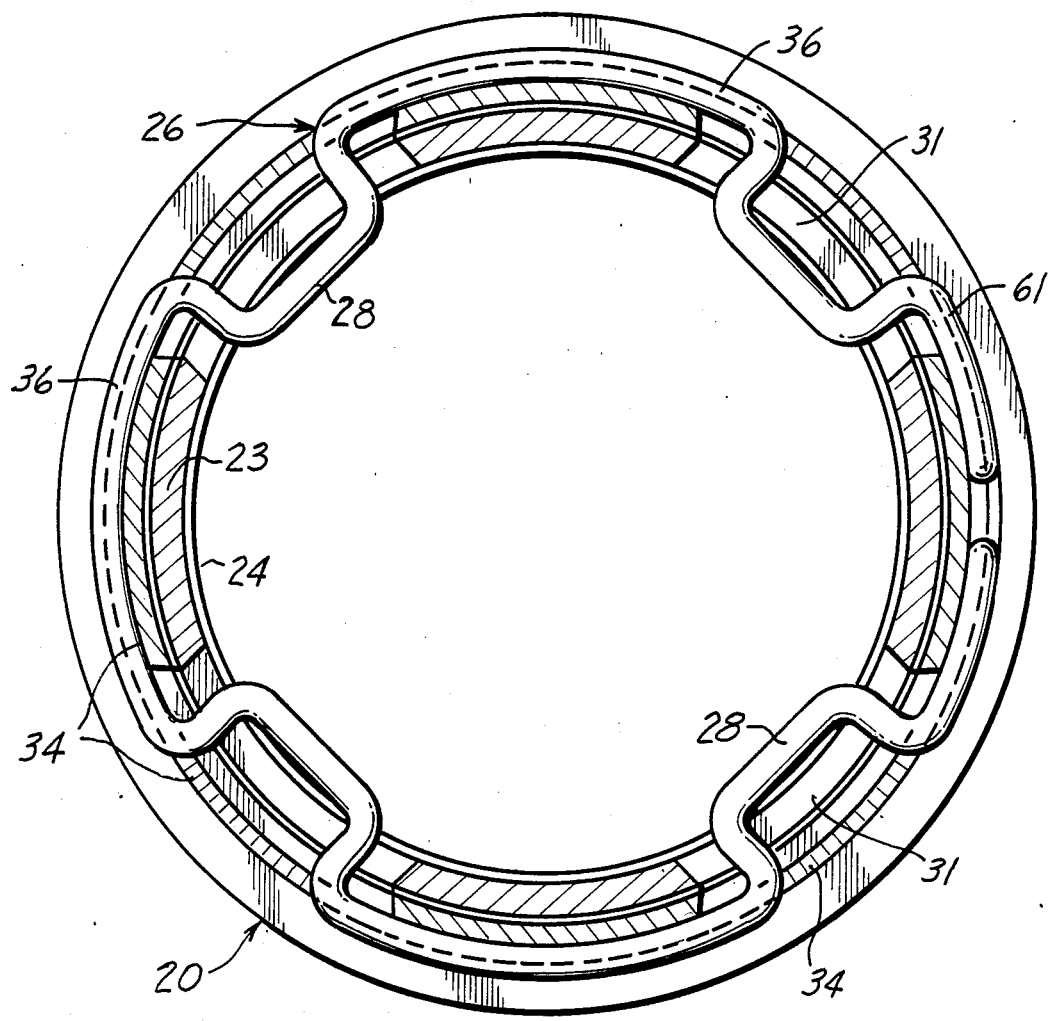
FIG. 2 is a section taken on the line 2—2 in FIG. 1, with part of a circumferential portion removed for better visibility.

As shown, for instance, in FIGS. 1 and 2, where the locking means 26 and 46 include a spring wire 61, the locking members may be segments 28 of that spring wire bent to extend through the openings 31 or 51 in the first annular member 23. The internal ramp 34 or 54 in the second or third annular member 33 or 43 then extends under sections 36 of that spring wire between the segments 28, for lifting these segments with the sections 36 radially away from the tube retention shoulder 14 or 15 for a release of the ferrule 12 or 13 from the connector union upon axial sliding movement of the second or third annular member 33 or 43 on the first annular member 23.

Unlike the above mentioned U.S. Pat. No. 3,922,011, by T. Walters, the preferred embodiments of the invention do not propose use of a conical wrinkle configuration for the springs 61 and 62, and do not rely on a subjection of such springs to torsion in the coupling and uncoupling of associated tubes or pipes. Rather, corresponding portions of the spring segments 28 and sections 36 preferably are arranged in a radial plane through the annular member 23.

The spring segments or locking members 28 are moved radially outwardly to a release position and radially inwardly to a locking position, but are not stressed and deformed for that purpose in the manner shown, for instance, in the above mentioned U.S. Pat. No. 3,428,340, by H. L. Pelton.

Figure 4:
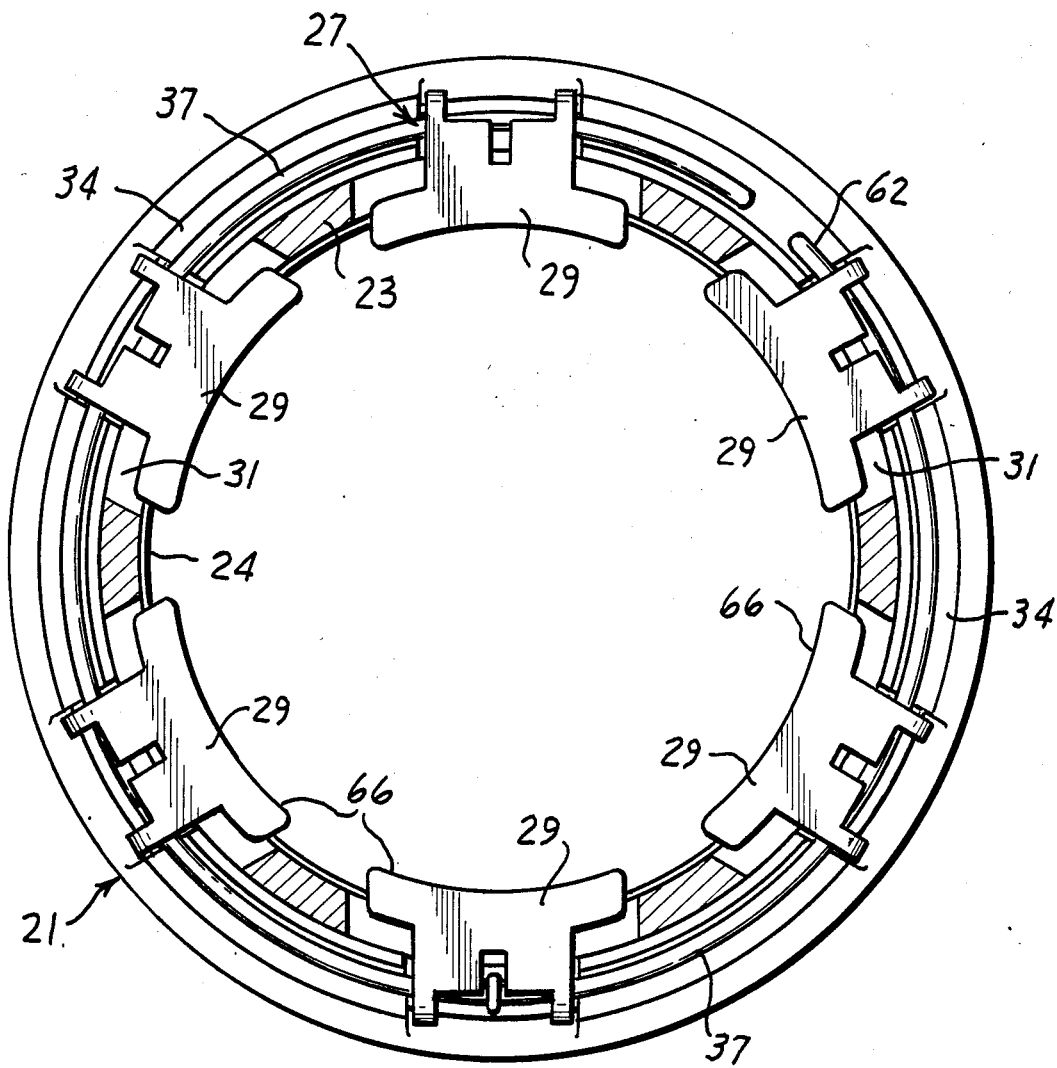
FIG. 4 is a section taken on the line 4—4 in FIG. 3, with part of a circumferential portion removed for better visibility.

According to the preferred embodiment of the subject invention illustrated in FIGS. 3 and 4, the locking members 29 are radially suspended from the spring wire 62. In this respect, even if locking members of the type shown at 29 are employed, the ramp portions 34 and 54 still are considered to extend under sections 36 or 37 of the locking means above the locking members, since the locking members actually are the radially inward portions of the tabs at 29 and 49 which effectively engage the ferrule shoulders 14 and 15.

The internal ramp 34 or 54 in the second or third annular member 33 or 43 extends under sections 37 of the spring wire above the locking members 29 for lifting these locking members with such sections radially away from the tube retention shoulder 14 or 15, for a release of the ferrule 12 or 13 from the connector union upon axial sliding movement of the second or third annular member 33 or 43 on the first annular member 23.

Unlike the locking members of the above mentioned U.S. Pat. Nos. 3,439,943, 3,352,576, by T. Thorne-Thomsen, and 1,587,079, by S. Machino, for instance, the locking members 29 are not slanted teeth that typically are pushed outwardly by a male member during insertion thereof, or that are pushed outwardly by a special sleeve for decoupling of the male member. Rather, the preferred locking members 29 have flat surfaces in two parallel radial planes extending at right angles to the longitudinal axis 35 through the first and second annular members 23 and 33 or, in the case of locking members 49, through the first and third annular members 23 and 43.

Moreover, according to a special feature of the preferred embodiment illustrated in FIGS. 3 and 4, the locking members 29 preferably have lateral extensions 66 in a radial plane through the second or third annular member 33 or 43 for engaging the ferrule 12 or 13 in the locking position over more than one half of a radial area of the tube retention shoulder 14 or 15. For instance, with the embodiment as illustrated in FIG. 4, it is easy to engage the tube retention shoulder over some 80% of its area in the locking position of the connector or union.

In practice, this vastly increases the locking ability and retention power of the connectors and unions according to the preferred embodiments of the subject invention, over earlier devices in which the design was inherently limited to a maximum feasible number of locking points, such as in the case of the proposals according to the above mentioned U.S. Pat. Nos. 3,428,340, by H. L. Pelton, 3,352,576, by T. Thorne-Thomsen, 2,521,701, by C. E. Earle et al, and 1,587,079, by S. Machino, and the Soviet Pat. No. 576,481.

According to a further embodiment of the invention, the second annular member 33 has a second internal ramp 64 radially spaced from the first internal ramp 34. In practice, that second internal ramp 64 serves to depress the locking means 26 or 27 or the locking members 28 or 29 toward the axis 35 for retention of ferrule 12 at the shoulder 14 upon a second axial sliding movement of the second annular member 33 on the first annular member 23 in a direction opposite to the tapering of the first internal ramp 34. In this manner, the locking means 26 or 27 or the locking members 28 or 29 may be operated in a push-pull manner according to the illustrated preferred embodiment, in which the locking means or members are pushed by the second ramp 64 to their locking position, as shown in FIGS. 1 and 3 for the second annular member 33, and alternatively are pulled to their release position by the first ramp 34 or by the ramp 54 as shown for the third annular member 43 in FIGS. 1 and 3.

In this respect, the third annular member 43 also has a second internal ramp 65. If the ramps 34 and 54 are considered first and second internal ramps, and the ramp 64 as a third internal ramp, then it may be said that the third annular member 43 has a fourth internal ramp 65 spaced from its second internal ramp 54 for depressing the second locking members 48 or 49 toward the axis 35 for retention of the second ferrule 13 at the second shoulder 15 upon a further axial sliding movement of the third annular member 43 on the first annular member 23 in a direction opposite to the tapering of the second internal ramp 54.

In the illustrated preferred embodiments of the subject invention, the push-pull operation of the locking means 26, 27, 46 and 47 advantageously combines itself with the push-pull operation of the second and third annular members 33 and 43 relative to each other, for the purpose of actuating the locking members 28, 29, 48 and 49 alternatively to their respective tube locking and tube release positions.

For increased manufacturing efficiency and structural integrity, each second and third annular member 33 and 43 preferably has an annular core 68 defining the first-mentioned internal ramp 34 or 54, and an annular cover 69 encompassing the core and defining the second-mentioned internal ramp 64 or 65. The core 68 and cover 69 are interconnected to provide a housing for the outer spring sections 36 and 56 shown in FIGS. 1 and 2, or for the spring 62 or spring sections 57 shown in FIGS. 3 and 4.

As shown in FIG. 1, the cover 69 may be provided with see-through openings 70 through which the position of the locking spring or segments may be inspected and thereby the state of operation of the connector union be determined. Imperfect interconnection also can be detected from the inability of the second or third annual member 33 or 43 to slide to its locking position if any locking member becomes hung up on a ferrule or O-ring.

Either or both of the second and third annular members 33 and 43 may be structured at its ramp 34 or 54 for releasable retention of the lifted locking members 28, 29, 48 or 49 out of the axial bore to provide the ferrule 12 or 13 with free ingress and egress at the connector or connnector. union 20, 21 or 22.

To this effect, either one or both second and third annular members 33 and 43 may have a shoulder 71 or 72 at the upper end of the tapering ramp 34 or 54 engaging the spring wires 61, 62, etc. for releasable retention of the listed locking members 28, 29, 48 or 49 out of the axial bore 24 to provide each or preferably both ferrules 12 and 13 with free ingress and egress at the connector or connector union.

In practice, this special feature explained herein with the aid of FIG. 5 stands in favorable contrast to the kind of prior-art approach which required insertion of a tube or male member against the bias of a locking spring, such as in the above mentioned U.S. Pat. Nos. 4,063,760, by L. Moreiras, 3,120,968, by J. H. Calvin, and 2,939,728, by J. A. Bitel, British Pat. No. 671,480, by R. Creelman and Soviet Pat. No. 576,481, by V. V. Abramov et al.

Accordingly the embodiment of the invention currently discussed with the aid of FIG. 5 thus not only avoids the resistance of any locking spring against proper insertion of the ferrules 12 and 13 into the connector union, but also avoids the design drawback of having to provide for any locking spring a circumferential accommodation groove in which the spring sits loosely, even in the locked position of the connector union.

It is a special feature of the preferred embodiments shown in FIGS. 1 to 4 that the latter advantages can also be realized without the shoulders 71 and 72 shown in FIG. 5, as long as the operator retains the second and third angular members 33 and 43 in their axial release positions, while the ferrules 12 and 13 are being inserted into the hollow-cylindrical bore 24 of the connector union. In the embodiments of FIGS. 1 to 4, such a retention of the annular members 33 and 43 for free ingress and egress is easily accomplished, since the unlocking positions of the second and third annular members 33 and 43 are their outward positions in their push-pull manner of operation. Accordingly, the operator can easily retain the second and third annular members 33 and 43 in their extreme unlocking positions simply by holding the connector union 20 or 21 with his or her fingers placed between the axially moved second and third annular members 33 and 43.

One advantage of omitting the shoulders 71 and 72 then is that the annular members 33 and 43 automatically will move axially to their locking positions when released by the operator. In other words, the ramp angles at 34 and 54 preferably are such that the inward bias of the locking spring 61 or 62 will move the annular member 33 and/or 43 and also the locking members 28, 29, 48 or 49 to their locking position. By the same token, this renders the illustrated preferred embodiments self-locking against vibrational forces as well, which is a great safety advantage in many practical situations.

In principle, the first and second annular ramps 34 and 64 and their counterparts at 54 and 65 could extend parallel to each other. However, according to the illustrated preferred embodiments of the invention, the outer second internal ramp 64 extends at a steeper angle than the inner first internal ramp 34 in the second annular member 33. Similarly, in the third annular member 43, the outer internal ramp 65 extends at a steeper angle than the inner internal ramp 54.

In practice, this enables a significant reduction in the axial width of each second and third annular member 33 and 43, since the ramps 34, 54, 64 and 65 would have to be much longer to provide sufficient play preventing the locking members 28, 29, 48 and 49 from cutting into the O-rings 16 and 17 during insertion and removal of the ferrules 12 and 13, if the ramps 34 and 64 or 54 and 65 were parallel to each other.

Connectors and unions according to the subject invention can be used to interconnect all kind of tubes and pipes, including those conducting various fluids, including gases and all kind of liquids, and including conduits for electrical cables and wires.

With connectors of the subject invention, it is easy to provide electrical bonding across tubes and connectors without additional electrical bonding devices.

Figure 6:
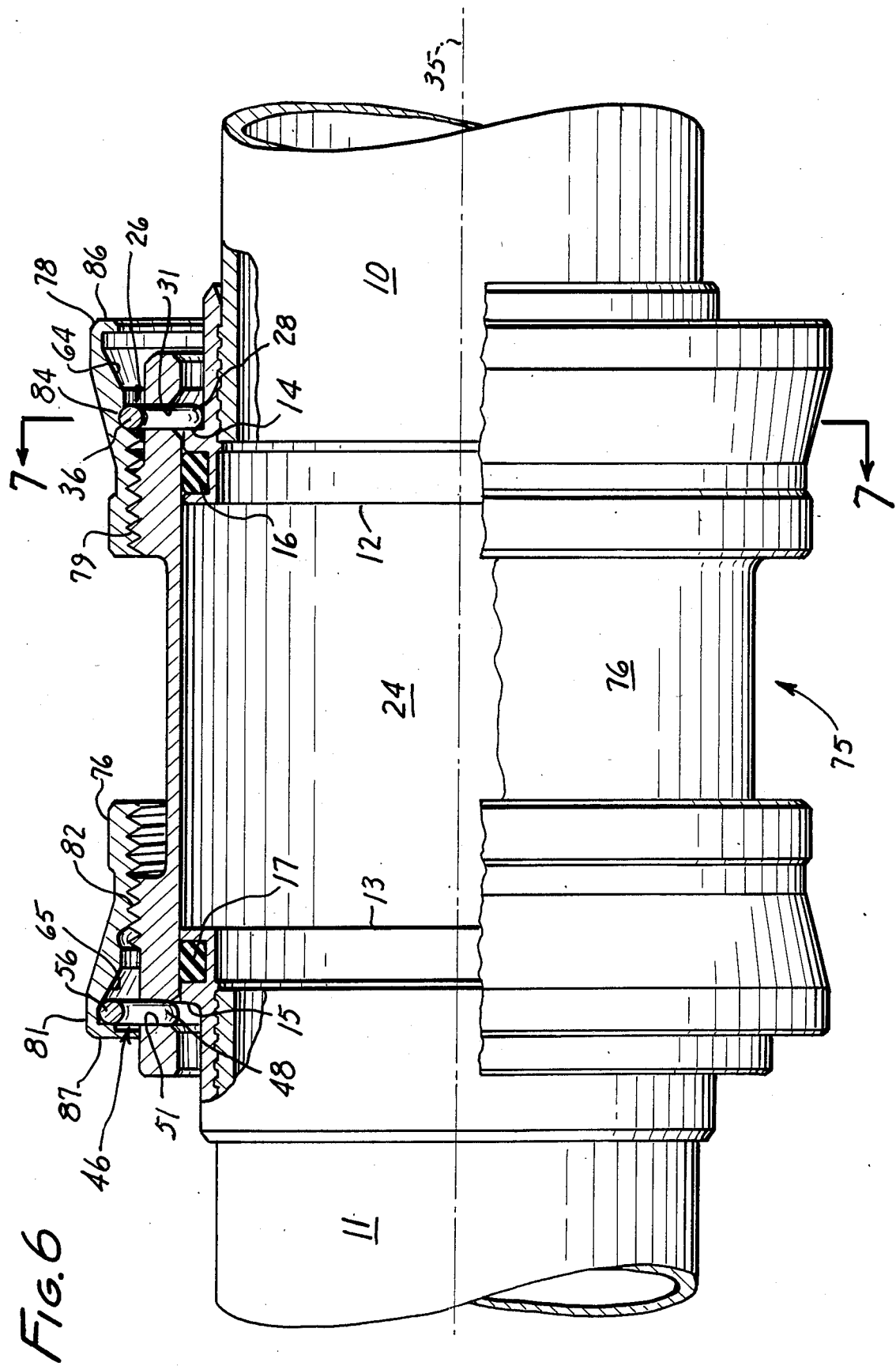
FIG. 6 is a side view, partially in section, of a connector union according to a further aspect of the invention, and of standard tubes connected thereby.
Figure 7:
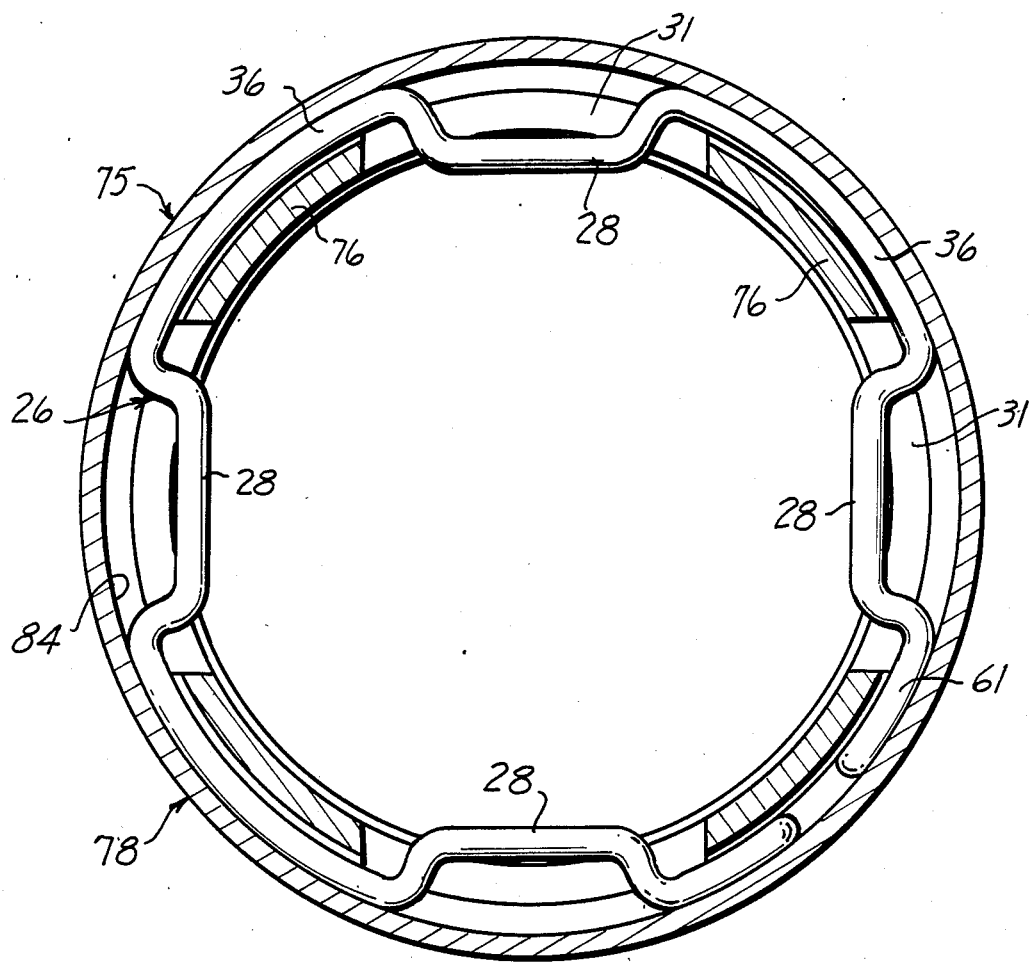
FIG. 7 is a section taken on the line 7—7 in FIG. 6.

The embodiment illustrated in FIGS. 6 and 7 shares many features with the preferred embodiments illustrated in FIGS. 1 to 4, and the description of those preferred embodiments should be consulted for an explanation of the nature and functions of the parts and features bearing like reference numerals as among FIGS. 1 to 4 and 6 and 7.

However, there are significant differences between the embodiments of FIGS. 1 to 5 on the one hand and the embodiment of FIGS. 6 and 7, on the other hand, so that FIGS. 6 and 7 may be understood as disclosing in fact a different aspect of the overall invention.

Again, the features and principle shown in FIGS. 6 and 7 may be used for connecting only a single tube at a time to a bulkhead or other typically stationary structure. However, the connector union 75 shown in FIGS. 6 and 7 serves to interconnect two standard tubes 10 and 11 having ferrules 12 and 13.

In particular, the connector union 75 has a first annular member 76 having an axial bore 24 for receiving the first and second ferrules 12 and 13 from different ends thereof. The axial bore 24 in the first annular member 36 has a continuously hollow-cylindrical configuration for receiving the first and second ferrules 12 and 13 at high flexibility, as far as longitudinal and laterally angular relative movements of the tubes 10 and 11 are concerned.

Spaced first and second locking means 26 and 46 peripheral of the first annular member 76 carry spaced first and second sets of locking members 28 and 48 extending through openings 31 and 51 in the first annular member 76, for retaining in a locking position the first and second ferrules 12 and 13 at their first and second tube retention shoulders 14 and 15.

A second annular member 78 is threaded on the first annular member 76 via mating threads 79. This second annular member 78 contains the first locking means 26 outside the first annular member 76.

A third annular member 81 is threaded on the first annular member 76 via mating threads 82 and contains the second locking means 46 outside the first annular member.

The second and third annular members 78 and 81 have first and second internal ramps 64 and 65 tapering in opposite directions relative to an axis 35 through the first, second and third annular members, for depressing, respectively, the first and second locking means 26 and 46 inwardly upon rotation of the second and third annular members 78 and 81 threaded on the first annular member 76, until the locking members 28 and 48 in the first and second sets are in their locking position, and for releasing the first and second locking means 26 and 46 upon rotation of the second and third annular members 78 and 81 until the first and second ferrules 12 and 13 may be removed from the connector union 75.

In practice, the second and third annular members 78 and 81 are not necessarily rotated at the same time, but may, for instance, be rotated one after another.

In this respect, the locking means 26, for instance, may be depressed inwardly upon rotation, in a first sense, of the second annular member 78 threaded on the first annular member 76, until the locking members 28 are in their illustrated locking position. Conversely, these locking members may be released radially away from the tube retention shoulder 14, for instance, for a release of the ferrule 12 from the connector or union 76 upon rotation of the second annular member 78 in a second sense opposite to the above mentioned first sense.

As shown for the second annular member 78 in FIG. 6, each second and third annular member may have a detention groove 84 adjacent a ramp for retaining the locking members 28 via the locking means 26 in the locking position against vibration.

The locking means may include a locking spring or locking spring means 61 biased radially away from the axis 35 and carrying the locking members 28. The ramp means may then include an internal ramp 64 extending over sections 36 of the locking spring for depressing the locking members 28 radially toward the axis 35 for a retention of the ferrule 12 at the tube retention shoulder 14.

The locking member 28 may be segments of the spring wire 61 bent to extend through the openings 31 in the first annular member 76. The ramp 64 then extends over sections 36 in the spring wire 61 between the segments 28 for depressing such segments radially toward the axis 35 for a retention of the ferrule 12 at the tube retention shoulder 14 upon rotation of the second annular member 78 in the above mentioned first or locking sense.

The second annular member 78 and preferably also the third annular member 81 are structured at their ramp means for movement of the locking members 28 and 48 out of the axial bore 24 upon rotation of the particular annular members 78 or 81 in the above mentioned second or release sense. In practice, this provides each ferrule 12 and 13 with free ingress and egress at the connector union 75, in contrast to those of the above mentioned prior-art proposals in which portions of locking springs were virtually in the way of a male member or tube, even in the release position of the connector.

Each of the second and third annular member 78 and 81 preferably has an inturned lip 86 and 87 at an upper end of the ramp means 64 and 65, respectively, for retention of the locking means 26 and 46, or locking spring 61, in the second and third annular members 78 and 81, for full integration of the connector 75.

This full integration of the connector stands in favorable contrast to those of the above mentioned prior-art proposals in which the locking spring was in danger of being pulled out of the locking structure or in which there were other parts that could be mislaid or omitted by careless personnel.

Features described above for the aspect of the invention shown in FIGS. 1 to 4 may also be employed for the related aspect of the invention shown in FIGS. 6 and 7. For example, as in FIGS. 3 and 4, first and second sets of locking members 29 and 49 may be radially suspended from spring wires 62. The first and second internal ramps 64 and 65 in the second and third annular members 78 and 81 then act on sections of the spring wires 62 for depressing the first and second sets of locking members radially to their locking position at the first and second tube retention shoulders 14 and 15 for retention of the first and second ferrules 12 and 13 in the connector union 75 upon rotation of the threaded second and third annular members 78 and 81 on the first annular member 76.

If separate locking members of the type shown in FIGS. 3 and 4 at 29 and 49 are also used in the connector union 75 of FIGS. 6 and 7, then the lateral locking member extensions 66 preferably are also employed in order to increase the locking member contact area at the ferrule to more than half of a radial area of the tube retention shoulder 14 or 15.

Various other combinations, modifications or variations within the spirit and scope of the subject invention and equivalents thereof will become apparent to those skilled in the art from the subject extensive disclosure.

I claim:

1. A fully integrated self-contained connector for use on standard tubes having a ferrule defining a tube retention shoulder, comprising in combination:
   a first annular member having an axial bore for receiving said ferrule;
   locking means including a spring wire peripheral of said first annular member and carrying locking members extending through openings in said first annular member for retaining in a locking position said ferrule at said tube retention shoulder;
   a second annular member axially slideable on said first annular member and housing said spring wire outside said first annular member; and
   said second annular member having an internal ramp tapering relative to an axis through said first and second annular members and extending under sections of said spring wire between locking members for lifting said locking members via said spring wire radially away from said tube retention shoulder for a release of said ferrule from said connector upon axial sliding movement of said second annular member on said first annular member in the direction of said tapering.

2. A connector as claimed in claim 1, wherein:
said second annular member is structured at said ramp for releasable retention of said lifted locking members out of said axial bore to provide said ferrule with free ingress and egress at said connector.

3. A connector as claimed in claim 1, wherein:
said second annular member has a shoulder at an upper end of said tapering ramp for releasable retention of said lifted locking members out of said axial bore to provide said ferrule with free ingress and egress at said connector.

4. A connector as claimed in claim 1, wherein:
said locking means are biased against said internal ramp radially inwardly toward said axis, but are lifted against said bias by said tapering ramp upon said axial sliding movement of said second annular member.

5. A connector as claimed in claim 1, wherein:
said spring wire is biased against said internal ramp for lifting the locking members radially away from the tube retention shoulder for said release of the ferrule.

6. A connector as claimed in claim 1, wherein:
said locking members are segments of said spring wire bent to extend through said openings in said first annular member; and
said internal ramp in said second annular member extends under sections of said spring wire between said segments of said spring wire for lifting said segments with said sections radially away from said tube retention shoulder for said release of said ferrule from said connector upon said axial sliding movement of said second annular member on said first annular member.

7. A connector as claimed in claim 1, wherein:
said locking members are radially suspended from said spring wire and extend in a radial plane through said second annular member.

8. A connector as claimed in claim 7, wherein:
said locking members have lateral extensions in said radial plane through said second annular member for engaging said ferrule in said locking position over more than one half of a radial area of said tube retention shoulder.

9. A connector as claimed in claim 8, wherein:
said second annular member has a shoulder at an upper end of said tapering ramp engaging said spring wire for releasable retention of said lifted locking members out of said axial bore to provide said ferrule with free ingress and egress at said connector.

10. A connector as claimed in claim 1, wherein:
said axial bore in said first annual member has a continuously hollow-cylindrical configuration for receiving said ferrule.

11. A fully integrated self-contained connector for use on standard tubes having a ferrule defining a tube retention shoulder, comprising in combination:
   a first annular member having an axial bore for receiving said ferrule;
   locking means peripheral of said first annular member and carrying locking members extending through openings in said first annular member for retaining in a locking position said ferrule at said tube retention shoulder; and
   a second annular member axially slidable on said first annular member and housing said locking means outside said first annular member;

said second annular member having an internal ramp tapering relative to an axis through said first and second annular members and extending under sections of said locking means above said locking members for lifting said locking members via said locking means radially away from said tube retention shoulder for a release of said ferrule from said connector upon axial sliding movement of said second annular member on said first annular member in the direction of said tapering, and a second internal ramp spaced from the first-mentioned internal ramp for depressing said locking members toward said axis for retention of said ferrule at said shoulder upon a second axial sliding movement of said second annular member on said first annular member in a direction opposite to said tapering.

12. A connector as claimed in claim 11, wherein:
said second annular member has an annular core defining said first-mentioned internal ramp, and an annular cover encompassing said core and defining said second internal ramp.

13. A connector as claimed in claim 11, wherein:
said second internal ramp extends at a steeper angle than said first-mentioned internal ramp.

14. A fully integrated self-contained connector union for interconnecting two standard tubes having, respectively a first ferrule and a second ferrule defining a first tube retention shoulder and a second tube retention shoulder, comprising in combination:
a first annular member having an axial bore for receiving said first and second ferrules from different ends thereof;
first locking means including a first spring wire peripheral of said first annular member and carrying first locking members extending through openings in said first annular member for retaining in a locking position said first ferrule at said first tube retention shoulder;
a second annular member axially slidable on said first annular member and housing said first spring wire outside said first annular member;
said second annular member having a first internal ramp tapering relative to an axis through said first and second annular members and extending under sections of said first spring wire between said first locking members for lifting said first locking members via said first spring wire radially away from said first tube retention shoulder for a release of said first ferrule from said connector union upon axial sliding movement of said second annular member on said first annular member in the direction of said tapering of the first ramp;
second locking means including a second spring wire peripheral of said first annular member and carrying at an axial distance from said first locking members second locking members extending through further openings in said first annular member for retaining in a locking position said second ferrule at said second tube retention shoulder;
a third annular member axially slidable on said first annular member and housing said second spring wire outside said first annular member;
said third annular member having a second internal ramp tapering relative to an axis through said first and third annular members and extending under sections of said second spring wire between said second locking members for lifting said second locking members via said second spring wire radially away from said second tube retention shoulder for a release of said second ferrule from said connector union upon axial sliding movement of said third annular member on said first annular member in the direction of the tapering of said second ramp; and
said second internal ramp tapering in a direction opposite said tapering of the first internal ramp, whereby said second ferrule is released upon axial sliding movement of said third annular member in a direction opposite to said axial sliding movement of the second annular member.

15. A connector union as claimed in claim 14, wherein:
said second internal ramp structurally represents a mirror image of said first internal ramp.

16. A connector union as claimed in claim 14, wherein:
at least said second annular member is structured at said first ramp for releasable retention of said first lifted locking members out of said axial bore to provide said first ferrule with free ingress and egress at said connector union.

17. A connector union as claimed in claim 14, wherein:
at least said second annular member has a shoulder at an upper end of said tapering first ramp for releasable retention of said lifted first locking members out of said axial bore to provide said first ferrule with free ingress and egress at said connector union.

18. A connector union as claimed in claim 14, wherein:
said first and second spring wire are biased, respectively, against said first and second internal ramps radially inwardly toward said axis, but are lifted against said bias by said first and second tapering ramps upon said axial sliding movement of said second and third annular members, respectively.

19. A connector in claim 14, wherein:
said first locking members are first segments of said first spring wire bent to extend through openings in said first annular member;
said first internal ramp in said second annular member extends under sections of said first spring wire between said first segments for lifting said first segments with said sections radially away from said first tube retention shoulder for said release of said first ferrule from said connector upon said axial sliding movement of said second annular member on said first annular member;
said second locking members are second segments of said second spring wire bent to extend through openings in said first annular member; and
said second internal ramp in said third annular member extends under sections of said second spring wire between said second segments for lifting said second segments with the latter sections radially away from said second tube retention shoulder for said release of said second ferrule from said connector upon said axial sliding movement of said third annular member on said first annular member.

20. A connector union as claimed in claim 14, wherein:
said first and second locking members are first and second segments of said first and second spring wires, respectively, bent to extend into said axial bore in said first annular member;

said first internal ramp in said second annular member extends under sections of said first spring wire between said first segments for lifting said first segments axially away from said first tube retention shoulder for release of said first ferrule from said connector union upon said axial sliding movement of said second annular member on said first annular member; and said second internal ramp in said third annular member extends under sections of said second spring wire between said second segments for lifting said second segments axially away from said second tube retention shoulder for release of said second ferrule from said connector union upon said axial sliding movement of said third annular member on said first annular member.

21. A connector union as claimed in claim 14, wherein:
said first and second locking members are radially suspended from said first and second spring wires, respectively.

22. A connector union as claimed in claim 14, wherein:
said axial bore in said first annual member has a continuously hollow-cylindrical configuration for receiving said first and second ferrules.

23. A fully integrated self-contained connector union for interconnecting two standard tubes having, respectively, a first ferrule and a second ferrule defining a first tube retention shoulder and a second tube retention shoulder, comprising in combination:
a first annular member having an axial bore for receiving said first and second ferrules from different ends thereof;
first locking means peripheral of said first annular member and carrying first locking members extending through openings in said first annular member for retaining in a locking position said first ferrule at said first tube retention shoulder;
a second annular member axially slidable on said first annular member and housing said first locking means outside said first annular member;
said second annular member having a first internal ramp tapering relative to an axis through said first and second annular members and extending under sections of said first locking means above said first locking members for lifting said first locking members via said first locking means radially away from said first tube retention shoulder for a release of said first ferrule from said connector union upon axial sliding movement of said second annular member on said first annular member in the direction of said tapering of the first ramp;
second locking means peripheral of said first annular member and carrying at an axial distance from said first locking members second locking members extending through further openings in said first annular member for retaining in a locking position said second ferrule at said second tube retention shoulder;
a third annular member axially slideable on said first annular member and housing said second locking means outside said first annular member;
said third annular member having a second internal ramp tapering relative to an axis through said first and third annular members and extending under sections of said second locking means above said second locking members for lifting said second locking members via said second locking means radially away from said second tube retention shoulder for a release of said second ferrule from said connector union upon axial sliding movement of said third annular member on said first annular member in the direction of the tapering of said second ramp;

said second annular member also having a third internal ramp spaced from said first internal ramp for depressing said first locking members toward said axis for retention of said first ferrule at said first shoulder upon a second axial sliding movement of said second annular member on said first annular member in a direction opposite to said tapering of the first internal ramp; and said third annular member having a fourth internal ramp spaced from said second internal ramp for depressing said second locking members toward said axis for retention of said second ferrule at said second shoulder upon a further axial sliding movement of said third annular member on said first annular member in a direction opposite to the tapering of said second internal ramp.

24. A fully integrated self-contained connector union for interconnecting two standard tubes having, respectively, a first ferrule and a second ferrule defining a first tube retention shoulder and a second tube retention shoulder, comprising in combination;
a first annular member having an axial bore for receiving said first and second ferrules from different ends thereof;
first locking members for retaining in a locking position said first ferrule at said first tube retention shoulder in said first annular member and for alternatively releasing said first ferrule from said connector union in a release position of said first locking members;
second locking members located at an axial distance from said first locking members for retaining in a locking position said second ferrule at said second tube retention shoulder in said first annular member and for alternatively releasing said second ferrule from said connector union in a release position of said second locking members;
second and third annular members axially slidable on said first annular member in a push-pull manner relative to each other, including a first direction toward each other and a second direction away from each other; and
means for linking said first and second locking members to said second and third annular members, respectively, including means for actuating and retaining said first and second locking members to the locking position upon axial sliding of said second and third annular members in one of said first and second directions, and for actuating said first and second locking members to the release position upon axial sliding of said second and third annular members in the other of said first and second directions;
said actuating means including in said second and third annular members; respectively, first and second internal ramps tapering in opposite directions relative to an axis through said first, second and third annular members; and
said linking means are biased against said first and second internal ramps radially inwardly toward a longitudinal axis of said axial bore, but are lifted against said bias by said first and second tapering ramps upon axial sliding movement of said second and third annular members.

25. A connector union as claimed in claim 24, wherein:
said first and second annular members are structured at said first and second ramps for releasable retention of said first and second locking members in the release position to provide said first and second ferrules with free ingress and egress at said connector union.

26. A connector union as claimed in claim 24, wherein:
each of said second and third annular members has a shoulder at upper ends of said tapering first and second ramps engaging said first and second locking members, for releasable retention of said first and second locking members in the release position to provide said first and second ferrules with free ingress and egress at said connection union.

27. A connector union as claimed in claim 24, wherein:
said actuating means include, in said first and second annular members, respectively, third and fourth internal ramps spaced from said first and second internal ramps, respectively, for actuating said first and second locking members via said linking means to said locking position upon axial sliding of said second and third annular members in said one direction.

28. A connector union as claimed in claim 24, wherein:
said axial bore in said first annual member has a continuously hollow-cylindrical configuration for receiving said first and second ferrules.

29. A fully integrated self-contained connector for use on standard tubes having a ferrule defining a tube retention shoulder, comprising in combination:
a first annular member having an axial bore for receiving said ferrule;
locking means including a radially outwardly biased spring wire peripheral of said first annular member and carrying locking members extending through openings in said first annular member for retaining in a locking position said ferrule at said tube retention shoulder; and
a second annular member threaded on said first annular member and containing said spring wire outside said first annular member;
said second annular member having internal ramp means tapering relative to an axis through said first and second annular members for depressing said locking means inwardly upon rotation in a first sense of said second annular member threaded on said first annular member until said locking members are in a locking position, and for releasing said locking members radially away from said tube retention shoulder for a release of said ferrule from said connector upon rotation of said second annular member in a second sense, said second annular member having an inturned lip at an upper end of said ramp means for retention of said locking means in said second annual member.

30. A connector as claimed in claim 29, wherein:
said locking members are segments of said spring wire bent to extend through said openings in said first annular member; and
said ramp means include an internal ramp in said second annular member extending over sections of said spring wire for depressing said segments radially toward said axis for a retention of said ferrule at said tube retention shoulder upon rotation of said second annular member in said first sense.

31. A connector as claimed in claim 29, wherein:
said second annular member is structured at said ramp means for movement of said locking members out of said axial bore upon rotation of said second annular member in said second sense, to provide said ferrule with free ingress and egress at said connector.

32. A fully integrated self-contained connector for use on standard tubes having a ferrule defining a tube retention shoulder, comprising, in combination:
a first anular member having an axial bore for receiving said ferrule;
locking means peripheral of said first annular member and carrying locking members extending through openings in said first annular member for retaining in a locking position said ferrule at said tube retention shoulder;
a second annular member threaded on said first anular member and containing said locking means outside said first annular member;
said second annular member having internal ramp means tapering relative to an axis through said first and second annular members for depressing said locking means inwardly upon rotation in a first sense of said second annular member threaded on said first annular member until said locking members are in said locking position, and for releasing said locking members radially away from said tube retention shoulder for a release of said ferrule from said connector upon rotation of said second annular member in a second sense; and
a detention groove in said second annular member adjacent said ramp for retaining said locking members via said locking means in said locking position against vibration.

33. A fully integrated self-contained connector for use on standard tubes having a ferrule defining a tube retention shoulder, comprising, in combination:
a first annular member having an axial bore for receiving said ferrule;
locking means peripheral of said first annular member and carring locking members extending through openings in said first annular member for retaining in a locking position said ferrule at said tube retention shoulder;
said locking means include locking spring means biased radially away from said axis and carrying said locking members;
a second annular member threaded on said first annular member and containing said locking means outside said first annular member;
said second annular member having internal ramp means tapering relative to an axis through said first and second annular members for depressing said locking means inwardly upon rotation in a first sense of said second annular member threaded on said first annular member until said locking members are in said locking position, and for releasing said locking members radially away from said tube retention shoulder for a release of said ferrule from said connector upon rotation of said second annular member in a second sense; and said ramp means include an internal ramp extending over sections of said locking spring means for depressing the locking members radially toward said axis for a retention of said ferrule at the tube retention shoulder.

34. A fully integrated self-contained connector union for interconnecting two standard tubes having, respectively, a first ferrule and a second ferrule defining a first tube retention shoulder and a second tube retention shoulder, comprising in combination:
   a first annular member having an axial bore for receiving said first and second ferrules from different ends thereof;
   spaced first and second locking means including, respectively, first and second spring wires peripheral of said first annular member and carrying spaced first and second sets of locking members extending through openings in said first annular member for retaining in a locking position said first and second ferrules at said first and second tube retention shoulders;
   a second annular member threaded on said first annular member and containing said first spring wire outside said first annular member; and
   a third annular member threaded on said first annular member and containing said second spring wire outside said first annular member;
   said second and third annular members having first and second internal ramps tapering in opposite directions relative to an axis through said first, second and third annular members for depressing, respectively, said first and second locking means inwardly upon rotation of said second and third annular members threaded on said first annular member until said locking members in said first and second sets are in their locking position, and for releasing said first and second locking means upon rotation of said second and third annular members until said first and second ferrules may be removed from said connector union.

35. A connector union as claimed in claim 34, wherein:
   said axial bore in said first annular member has a continuously hollow-cylindrical configuration for receiving said first and second ferrules.

36. A fully integrated self-contained connector union for interconnecting two standard tubes having, respectively, a first ferrule and a second ferrule defining a first tube retention shoulder and a second tube retention shoulder, comprising in combination:
   a first annular member having an axial bore for receiving said first and second ferrules from different ends thereof;
   spaced first and second locking means peripheral of said first annular member and carrying spaced first and second sets of locking members extending through openings in said first annular member for retaining in a locking position said first and second ferrules at said first and second tube retention shoulders;
   a second annular member threaded on said first annular member and containing said first locking means outside said first annular member; and
   a third annular member threaded on said first annular member and containing said second locking means outside said first annular member;
   said second and third annular members having first and second internal ramps tapering in opposite directions relative to an axis through said first, second and third annular members for depressing, respectively, said first and second locking means inwardly upon rotation of said second and third annular members threaded on said first annular member until said locking members in said first and second sets are in their locking position, and for releasing said first and second locking means upon rotation of said second and third annular members until said first and second ferrules may be removed from said connector union; and
   a detention groove in each of said second and third annular members adjacent said first and second ramps for retaining the locking members in said first and second sets via said first and second locking means in their locking position against vibration.

37. A fully integrated self-contained connnector union for interconnecting two standard tubes having, respectively, a first ferrule and a second ferrule defining a first tube retention shoulder and a second tube retention shoulder, comprising in combination:
   a first annular member having an axial bore for receiving said first and second ferrules from different ends thereof;
   spaced first and second locking means peripheral of said first annular member and carrying spaced first and second sets of locking members extending through openings in said first annular members for retaining in a locking position said first and second ferrules at said first and second tube retention shoulders;
   a second annular member threaded on said first annular member and containing said first locking means outside said first annular member; and
   a third annular member threaded on said first annular member and containing said second locking means outside said first annular member;
   said first and second locking means include outwardly biased first and second spring wires, respectively;
   said first and second sets of locking members are first and second segments of said first and second spring wires, respectively, bent to extend into said axial bore in said first annular member;
   said second and third annular members having first and second internal ramps tapering in opposite directions relative to an axis through said first, second and third annular members for depressing, respectively, said first and second locking means inwardly upon rotation of said second and third annular members threaded on said first annular member until said locking members in said first and second sets are in their locking position, and for releasing said first and second locking means upon rotation of said second and third annular members until said first and second ferrules may be removed from said connector union; and
   said first and second internal ramps in said second and third annular members act on sections of said first and second spring wires for depressing said first and second segments radially to their locking position at said first and second tube retention shoulders for retention of said first and second ferrules in said connector union upon rotation of said threaded second and third annulr members on said first annular member.

38. A fully integrated self-contained connector union for interconnecting two standard tubes having, respectively, a first ferrule and a second ferrule defining a first tube retention shoulder and a second tube retention shoulder, comprising in combination:

- a first annular member having an axial bore for receiving said first and second ferrules from different ends thereof;
- spaced first and second locking means peripheral of said first annular member and carrying spaced first and second sets of locking members extending through openings in said first annular member for retaining in a locking position said first and second ferrules at said first and second tube retention shoulders;
- a second annular member threaded on said first annular member and containing said first locking means outside said first annular member;
- a third annular member threaded on said first annular member and containing said second locking means outside said first annular member;
- said first and second locking means include outwardly biased first and second spring wires, respectively;
- said first and second sets of locking members are radially suspended from said first and second spring wires, respectively;
- said second and third annular members having first and secod internal ramps tapering in opposite directions relative to an axis through said first, second and third annular members for depressing, respectively, said first and second locking means inwardly upon rotation of said second and third annular members threaded on said first annular member until said locking members in said first and second sets are in their locking position, and for releasing said first and second locking means upon rotation of said second and third annular members until said first and second ferrules may be removed from said connector union; and
- said first and second internal ramps in said second and third annular members act on sections of said first and second spring wires for depressing said first and second sets of locking members radially to their locking position at said first and second tube retention shoulders for retention of said first and second ferrules in said connector union upon rotation of said threaded second and third annular members on said first annular member.

* * * * *